United States Patent
Lee et al.

(10) Patent No.: US 9,042,123 B2
(45) Date of Patent: May 26, 2015

(54) FULL BRIDGE DC-DC CONVERTER THAT APPLIES CURRENT DOUBLER

(71) Applicant: Hyundai Motor Company, Seoul (KR)

(72) Inventors: Dae-Woo Lee, Gyeongsangbuk-do (KR); Byeong-Seob Song, Gyeonggi-Do (KR); Jin-Young Yang, Hanam Gyeonggi-Do (KR); Woo-Young Lee, Chungcheongbuk-do (KR)

(73) Assignee: Hyundai Motor Company, Seoul (KR)

( * ) Notice: Subject to any disclaimer, the term of this patent is extended or adjusted under 35 U.S.C. 154(b) by 145 days.

(21) Appl. No.: 14/010,027

(22) Filed: Aug. 26, 2013

(65) Prior Publication Data
US 2014/0355310 A1 Dec. 4, 2014

(30) Foreign Application Priority Data
May 31, 2013 (KR) .................. 10-2013-0062539

(51) Int. Cl.
*H02M 3/335* (2006.01)

(52) U.S. Cl.
CPC ........ *H02M 3/33569* (2013.01); *H02M 3/3353* (2013.01); *Y02T 10/7005* (2013.01)

(58) Field of Classification Search
CPC . H02M 3/33592; H02M 3/3376; H02M 1/34; H02M 1/10; H01F 3/08; H01F 27/38
USPC ................. 363/17, 71, 65, 126; 323/271, 282
See application file for complete search history.

(56) References Cited

U.S. PATENT DOCUMENTS

| | | | |
|---|---|---|---|
| 5,663,867 A | 9/1997 | Honda et al. | |
| 5,870,291 A * | 2/1999 | Farrington et al. | 363/17 |
| 5,920,473 A * | 7/1999 | Sturgeon | 363/98 |
| 6,504,739 B2 | 1/2003 | Phadke | |
| 6,992,902 B2 | 1/2006 | Jang et al. | |
| 7,969,752 B2 * | 6/2011 | Bong et al. | 363/17 |

(Continued)

FOREIGN PATENT DOCUMENTS

| | | |
|---|---|---|
| KP | 10-1998-0031946 | 7/1998 |
| KP | 10-2002-0009289 | 2/2002 |

(Continued)

OTHER PUBLICATIONS

Kutkut, N.H., "A Full Bridge Soft Switched Telecom Power Supply with a Current Doubler Rectifier," Telecommunications Energy Conference, 1997, INTELEC 97., 19th International, IEEE, pp. 344-351.

*Primary Examiner* — Rajnikant Patel
(74) *Attorney, Agent, or Firm* — Mintz Levin Cohn Ferris Glovsky and Popeo, P.C.; Peter F. Corless

(57) ABSTRACT

A full bridge DC-DC converter to which a current doubler is applicable is provided and includes a transformer and a switching circuit that converts a high direct current voltage into a high alternating current voltage and then outputs the high alternating current voltage to the primary side of the transformer. In addition, an output circuit receives and processes the output of the secondary side of the transformer and supplies the processed output to an electric load. The output circuit includes a first inductor, a first contact resistor, a second inductor, a second contact resistor, a first diode, a third contact resister, a second diode, and a fourth contact resister.

6 Claims, 4 Drawing Sheets

(56) References Cited

U.S. PATENT DOCUMENTS 8,743,575 B2 * 6/2014 Nymand ............... 363/65
8,797,773 B2 * 8/2014 George ................ 363/98

FOREIGN PATENT DOCUMENTS

KP    10-2008-0036027    4/2008
KP    10-2010-0082084    7/2010

* cited by examiner

FULL BRIDGE DC-DC CONVERTER THAT APPLIES CURRENT DOUBLER

CROSS-REFERENCE(S) TO RELATED APPLICATIONS

This application claims priority to Korean Patent Application No. 10-2013-0062539, filed on May 31, 2013, which is incorporated herein by reference in its entirety.

BACKGROUND

1. Field of the Invention

The present invention relates to a full bridge DC-DC converter, and particularly, to a full bridge DC-DC converter to which a current doubler is applicable.

2. Description of Related Art

In general, a full bridge direct current-direct current (DC-DC) converter converts a high DC voltage supplied from a high-voltage battery of a vehicle into a low DC voltage and provides an electric load of a vehicle such as an auxiliary battery with the low DC voltage.

In one of the conventional full bridge DC-DC converters, a full bridge DC-DC converter to which a current doubler is applicable is utilized. The full bridge DC-DC converter converts DC input voltage into alternating current (AC) voltage via a primary full bridge circuit (e.g., this full bridge circuit consists of FET (field effect transistor)), converts high AC voltage into low AC voltage via a transformer and outputs low AC voltage to an electric load via a secondary circuit of the transformer, which includes a secondary inductor and a diode. In the full bridge DC-DC converter to which a current doubler is applicable, the transformer is indispensable for reducing high voltage and isolating it from high voltage. When DC current is generated in the transformer, the transformer can be saturated.

In addition, causes exerting an influence on the saturation of the transformer may be mainly divided into causes of the primary side and causes of the secondary side of the transformer. The causes of the primary side may be due to FET Rds-on of the full bridge circuit, and the causes of the secondary side may be due to parasitic resistance of the inductor, a deviation of contact resistance between the inductor and the transformer and a deviation of contact resistance between the output diode and the transformer. A value of FET Rds-on, a value of parasitic resistance of the inductor, and a deviation value of contact resistance between the output diode and the transformer, which influences a saturation of the transformer, can be managed to reduce the effect on a saturation of the transformer.

However, since a coupling area between the inductor and the transformer is substantially small and the inductor is coupled to the transformer by a screw, even when a substantially small torque deviation is generated when the inductor is coupled to the transformer, a deviation of contact resistance between the inductor and the transformer has an effect on a saturation of the transformer.

In the conventional full bridge DC-DC converter as described above, the diode is firstly coupled to the secondary side of the transformer by the screw, thus generating a contact resistance when the inductor is coupled to the transformer by the screw and causing a current unbalance. In addition, DC offset current is generated at the primary side of the transformer due to the current unbalance thus causing a saturation of the transformer to be generated. When the transformer is saturated, current may rapidly increase to generate high current in a switch element. Therefore, a heat and loss of the switch element may increase and noise generation may increase.

SUMMARY

An object of the present is to provide a full bridge DC-DC converter in which the coupling sequence of an output inductor and a diode to be connected to a secondary side of a transformer is changed to minimize the effect of contact resistors, which are formed when the transformer and the inductor are coupled to each other by a screw, on a saturation of the transformer, to thus reduce a heat and a loss of switch elements of the primary side and reduce noise generation.

Other objects and advantages of the present invention may be understood by the following description, and become apparent with reference to the exemplary embodiments of the present invention. In addition, it is obvious to those skilled in the art to which the present invention pertains that the objects and advantages of the present invention can be realized by the means as claimed and combinations thereof.

In order to achieve the above object, a full bridge DC-DC converter to which a current doubler is applicable, according to one aspect of the present invention may include a transformer that reduces a high AC voltage supplied to a primary side thereof and then outputs the AC voltage to a secondary side thereof; a switching circuit that converts a transmitted high DC voltage into a high AC voltage and then outputs the high AC voltage to the primary side of the transformer; and an output circuit that receives and processes the output of the secondary side of the transformer and supplies the processed output to an electric load, the output circuit may include a first inductor having one end connected to one end of the load side, a first contact resistor formed by connecting the other end of the first inductor and one end of the secondary side of the transformer, a second inductor having one end connected to one end of the load side, a second contact resistor formed by connecting the other end of the second inductor and the other end of the secondary side of the transformer, a first diode having an anode connected to a ground line which is the other end of the load side, a third contact resister formed by connecting a cathode of the first diode and electric contacts of the first inductor and the first contact resistor, a second diode having an anode connected to a ground line which is the other end of the load side, and a fourth contact resister formed by connecting a cathode of the second diode and electric contacts of the second inductor and the second contact resistor.

In the output circuit, a first value of the voltage drop caused by a first current flowed through the first contact resister, the first inductor, the load side, the second diode, the fourth contact resistor and the second contact resistor may be the substantially same as a second value of the voltage drop caused by a second current flowed through the second contact resister, the second inductor, the load side, the first diode, the third contact resistor and the first contact resistor, the value of the first current may be the substantially same as that of the second current, and the resistance value of the third contact resistor may be the substantially same as that of the fourth contact resistor.

In addition, the DC of the transformer may be maintained at about zero (0) regardless of a deviation between values of the first contact resistor and the second contact resistor. The first contact resistor may be formed by coupling a wire extended from the first inductor with a wire extended from one end of the secondary side of the transformer by a first screw, the second contact resistor may be formed by coupling a wire extended from the second inductor with a wire extended from the other end of the secondary side of the transformer by a second screw. The third contact resistor may be formed by coupling a portion of the wire extended from one end of the secondary side of the transformer, which is farther away from one end of the secondary side of the transformer than a coupling point obtained by the first screw, with a wire extended from the anode of the first diode by a third screw, and the fourth contact resistor may be formed by coupling a portion of the wire extended from the other end of the secondary side of the transformer, which is farther away from the other end of the secondary side of the transformer than a coupling point obtained by the second screw, with a wire extended from the anode of the second diode by a fourth screw.

In particular, the first screw and the second screw may be the substantially same size and a torque required for coupling the first screw may be the substantially same as that required for coupling the second screw. In addition, the third screw and the fourth screw may be the substantially same size and a torque required for coupling the third screw may be the substantially same as that required for coupling the fourth screw.

The switching circuit may include a first switching element, a second switching element, a third switching element and a fourth switching element, the switching circuit may be driven in a full bridge manner in which the first and third switching elements are simultaneously switched and the second and fourth switching elements are simultaneously switched by a driving clock applied from an exterior, and when a phase and a cycle of the driving clock applied for switching the first and fourth switching elements are fixed, an effective region of the output power transmitted to the primary side of the transformer from the switching circuit may be adjusted by changing a phase of the driving clock applied for switching the second and fourth switching elements.

DETAILED DESCRIPTION

Figure 1:
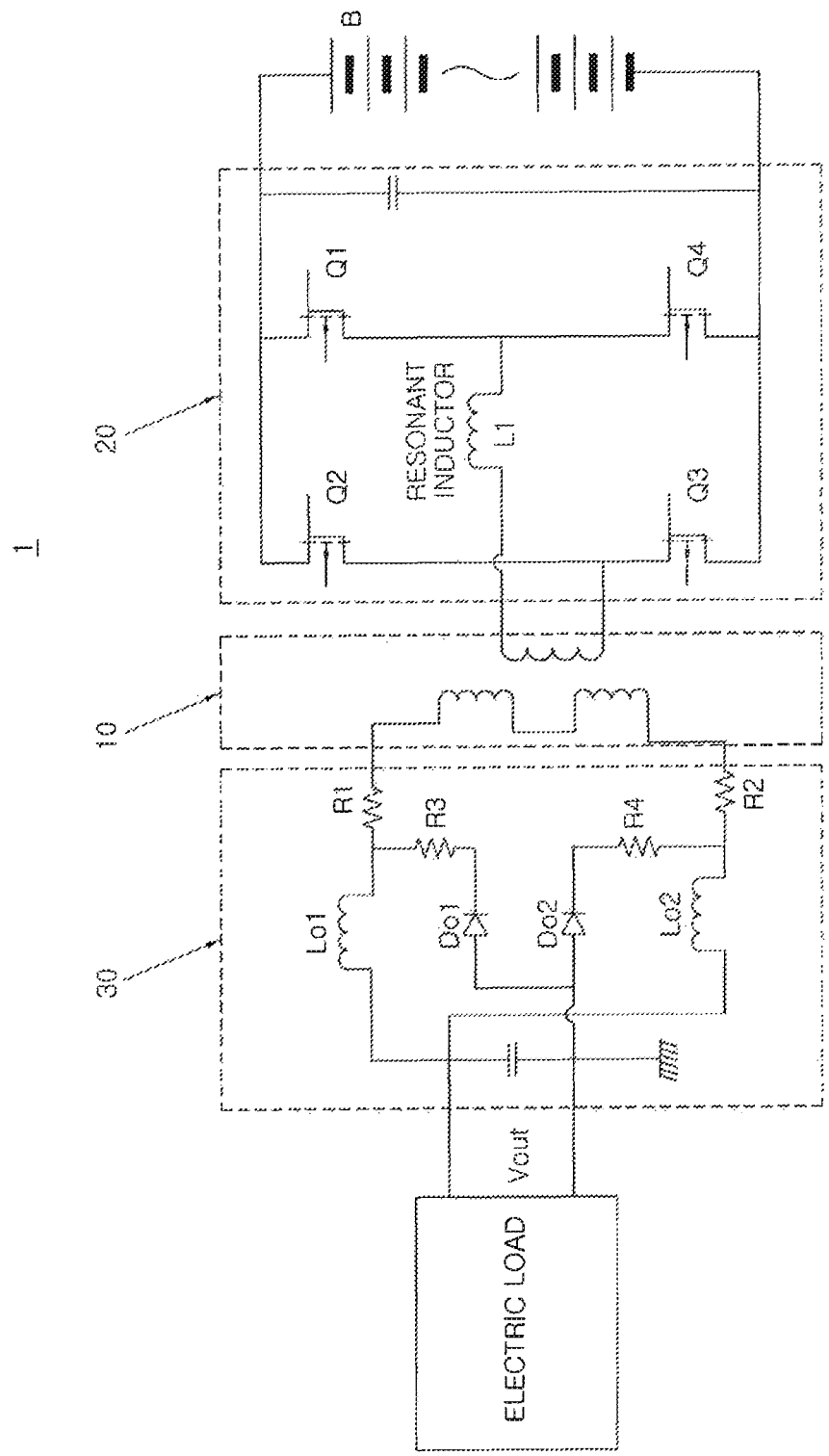
FIG. 1 is an exemplary schematic circuit diagram of a full bridge DC-DC converter in accordance with one exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A full bridge DC-DC converter to which a current doubler is applicable in accordance with exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The structure of the present invention is schematically shown in the drawings for illustrating the concept of the present invention, and a description on the known techniques in the structure is omitted. In addition, the exemplary embodiments of the present invention are provided for illustrating more completely to one ordinary skilled in the art. Thus, the shape and size of the elements may be exaggerated in the drawings.

The full bridge DC-DC may convert a high DC voltage transmitted from a power source such as a high voltage battery which is applicable to hybrid vehicles and electric vehicles into a low DC voltage and output the low DC voltage to an electric load such as a low voltage battery and an electric instrument for vehicle.

FIG. 1 is an exemplary schematic circuit diagram of a full bridge DC-DC converter in accordance with one exemplary embodiment of the present invention. As shown in FIG. 1, a full bridge DC-DC converter 1 may be classified into a transformer 10, a switching circuit 20 and an output circuit 30. The above classification is provided for the convenience of illustration, a structure of the full bridge DC-DC converter 1 in accordance with this exemplary embodiment is not limited to this classification.

The transformer 10 may be configured to transform a substantially high AC voltage transmitted from a primary side into a substantially low AC voltage and may transmit the AC voltage to a secondary side, and an electrical isolation of a vehicle body may be secured from high voltage. [NOTE: Please provide an exemplary or a range of a high AC voltage and a low AC voltage.]

The switching circuit 20 may be disposed at a primary side of the transformer 10 and may be configured to convert a substantially high DC voltage transmitted from a power source such as a high voltage battery B into a low AC voltage.

The switching circuit 20 may include a first switching element Q1, a second switching element Q2, a third switching element Q3 and a fourth switching element Q4, and the switching circuit may be driven in a full bridge manner in which the first and third switching elements Q1 and Q3 are simultaneously switched and the second and fourth switching elements Q2 and Q4 are simultaneously switched by a driving clock applied for driving the switching elements. [NOTE: Please provide an exemplary or a range of a high DC voltage.]

Figure 2:
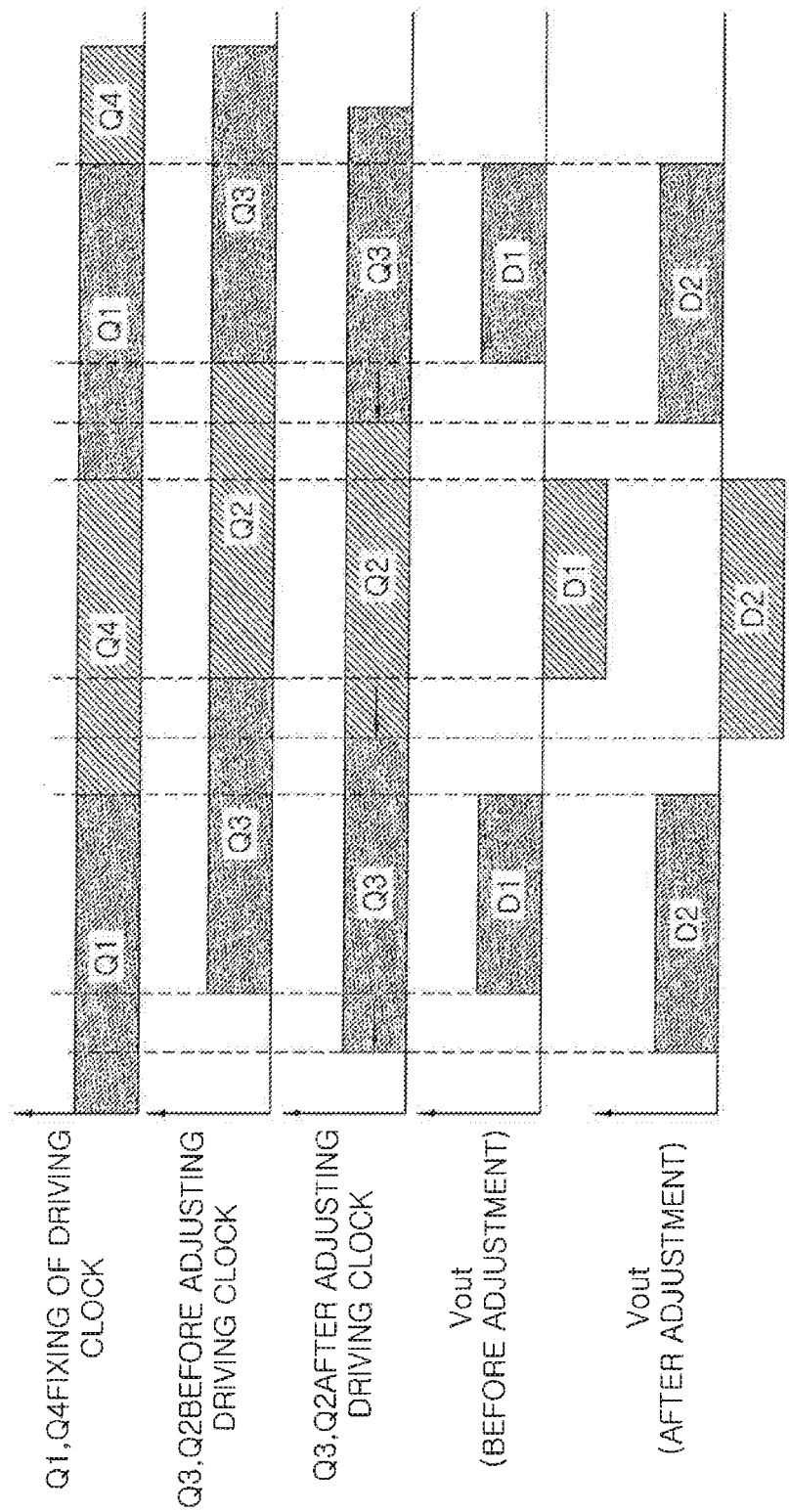
FIG. 2 is an exemplary view of a driving clock for driving a switching circuit in an operation of a full bridge DC-DC converter in accordance with one exemplary embodiment of the present invention.

An operation of the full bridge DC-DC converter 1 in accordance with this exemplary embodiment may be achieved by a driving clock which may be configured to drive the switching circuit 20. FIG. 2 is an exemplary view of a driving clock that drives the switching circuit for an operation of the full bridge DC-DC converter in accordance with one exemplary embodiment of the present invention. As shown in FIG. 2, by adjusting the driving clock for the third switching element Q3 and the second switching element Q2 after fixing the driving clock for the first switching element Q1 and the fourth switching element Q4, an effective region of the output voltage Vout of the load side may be changed from D1 to D1.

Figure 3:
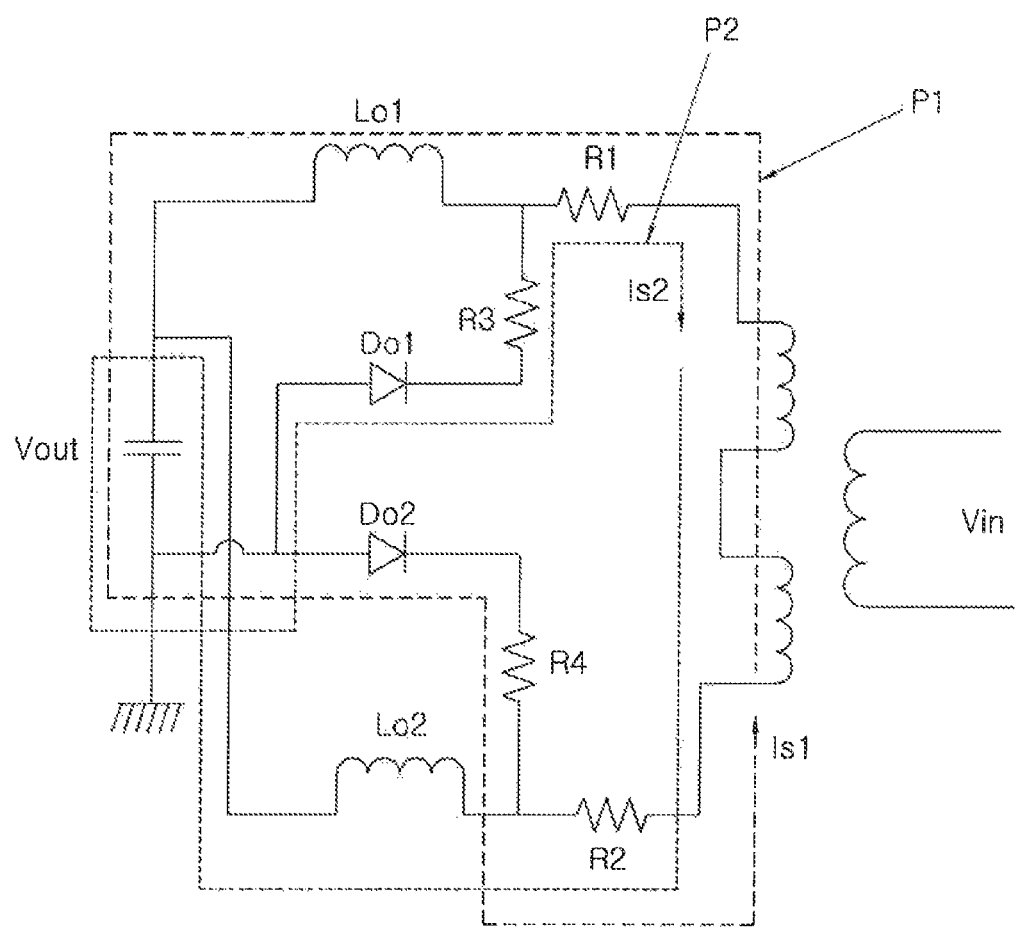
FIG. 3 is an exemplary view illustrating a structure and an operation of an output circuit in FIG. 1 in accordance with one exemplary embodiment of the present invention.

FIG. 3 is an exemplary view illustrating a structure and an operation of the output circuit in FIG. 1. The output circuit 30 may be configured to receive an output of a secondary side of the transformer 10, process the output through a structure described later and may supply the processed output to the electric load.

As shown in FIG. 3, the output circuit 30 may include a first inductor Lo1, a first contact resister R1, a second inductor Lo2, a second contact resister R2, a first diode Do1, a third contact resister R3, a second diode Do2 and a fourth contact resister R4. A first end of the first inductor Lo1 may be connected to a first end of a load side, and the first contact resister R1 may be formed by connecting a second end of the first inductor Lo1 and a first end of a secondary side of the transformer 10. A first end of the second inductor Lo2 may be connected to the first end of the load side, and the second contact resister R2 may be formed by connecting a second end of the second inductor Lo2 and a second end of the secondary side of the transformer 10.

An anode of the first diode Do1 may be connected to a ground line which is the second end of the load side, and the third contact resister R3 may be formed by connecting a cathode of the first diode Do1 and electric contacts of the first inductor Lo1 and the first contact resister R1. In addition, an anode of the second diode Do2 may be connected to a ground line which is the second end of the load side, and the fourth contact resister R4 may be formed by connecting a cathode of the second diode Do2 and electric contacts of the second inductor Lo2 and the second contact resister R2.

As shown in FIG. 3, a first branch line P1 may be formed by a first current Is1 flowed through the first contact resister R1, the first inductor Lo1, the load side Vout, the second diode Do2, the fourth contact resister R4 and the second contact resister R2. Further, a second branch line P2 may be formed by a second current Is2 flowed through the second contact resister R2, the second inductor Lo2, the load side Vout, the first diode Do1, the third contact resister R3 and the first contact resister R1 by means of electricity having a polarity opposite to the electricity that forms the first branch line P1. As expressed in equation 1, the value of voltage drop caused by the first branch line P1 may be same as the voltage drop caused by the second branch line P2.

$$(Is1 \times R1) + VLo1 + Vout + VDo2 + (Is1 \times R4) + (Is1 \times R2) =$$
$$(Is2 \times R2) + VLo2 + Vout + VDo1 + (Is2 \times R3) + (Is2 \times R1).$$
Equation 1

In particular, when the resistance value of the third contact resistor R3 is almost the same as that of the fourth contact resistor R4 and when the value of the first current Is1 is almost the same as that of the second current Is2, the Equation 1 may be expressed as the Equation 2.

$$(Is1 \times R1) + (Is1 \times R2) = (Is2 \times R2) + (Is2 \times R1)$$
Equation 2.

In a conventional full bridge DC-DC converter, when a deviation of the value of the contact resistor is generated by a torque adjustment when the transformer and the inductor are coupled with each other, the direct current is generated in the transformer, therefore the transformer may be saturated.

However, in the full bridge DC-DC converter 1 in accordance with this exemplary embodiment, even when a deviation (R1≠R2) between the values of the first contact resistor R1 and the second contact resistor R2 is generated by a torque adjustment when the transformer 10 and the inductors Lo1, Lo2 are coupled with each other, the direct current of the transformer 10 may be maintained at about zero (0) as indicated in the above equations. Therefore, it may be possible to prevent the transformer 10 from being saturated.

Figure 4:
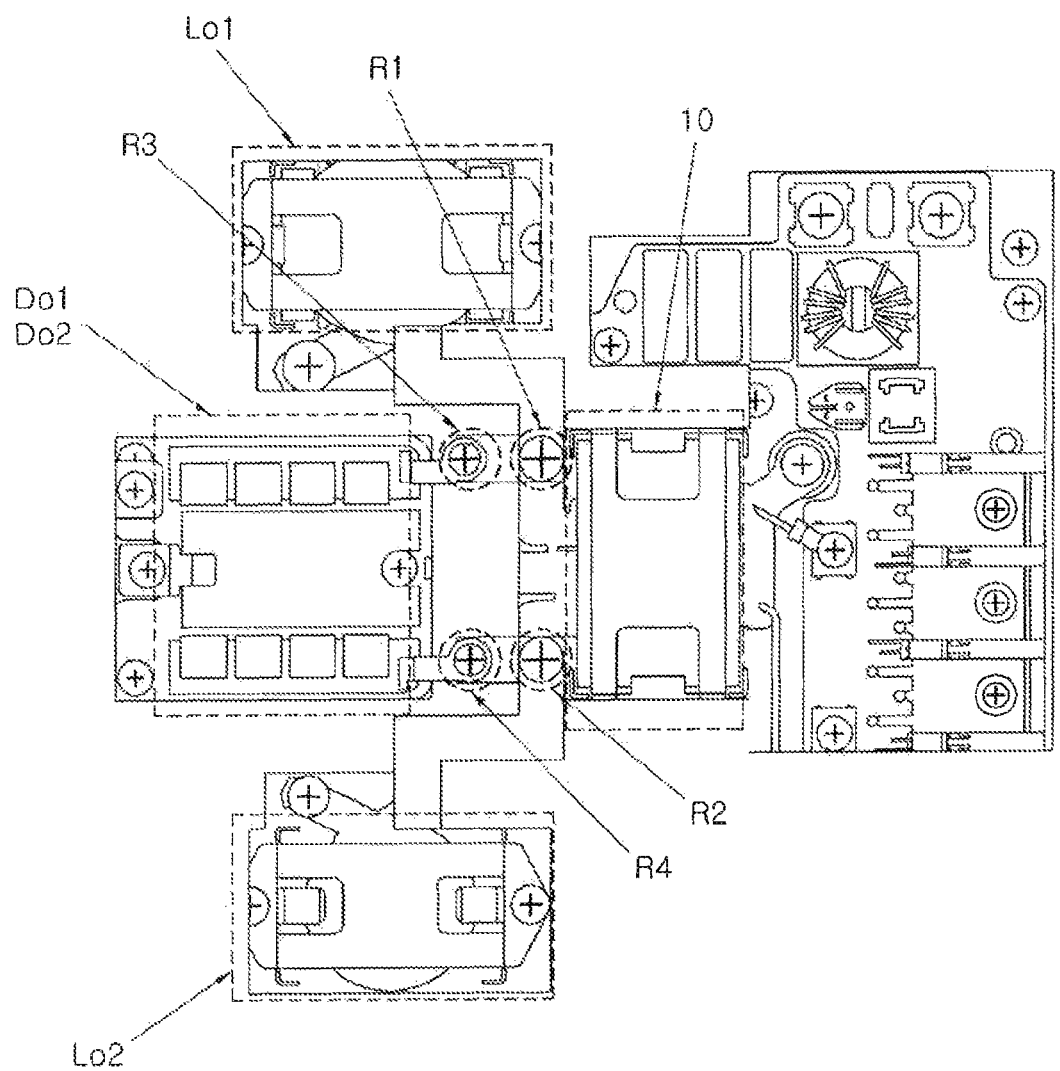
FIG. 4 is an exemplary view of a test product showing mechanical structures of first to fifth contact resistors shown in FIG. 3 in accordance with one exemplary embodiment of the present invention.

FIG. 4 is an exemplary view of a test product for showing mechanical structures of the first to fifth contact resistors shown in FIG. 3. Referring to FIG. 4, the first contact resistor R1 may be formed by coupling a wire extended from the first inductor Lo1 with a wire extended from a first end of the secondary side of the transformer 10 by a first screw. The second contact resistor R2 may be formed by coupling a wire extended from the second inductor Lo2 with a wire extended from a second end of the secondary side of the transformer 10 by a second screw.

Furthermore, the third contact resistor R3 may be formed by coupling a portion of the wire extended from the first end of the secondary side of the transformer 10, which is farther away from the first end of the secondary side of the transformer 10 than a coupling point obtained by the first screw, with a wire extended from the anode of the first diode Do1 by a third screw. The fourth contact resistor R4 may be formed by coupling a portion of the wire extended from the second end of the secondary side of the transformer 10, which is farther away from the second end of the secondary side of the transformer 10 than a coupling point obtained by the second screw, with a wire extended from the anode of the second diode Do2 by a fourth screw.

In particular, the first screw and the second screw may have the substantially same size and a torque required for coupling the first screw may almost be the substantially same as that required for coupling the second screw. Additionally, the third screw and the fourth screw may have the substantially same size and a torque required for coupling the third screw may almost be the substantially same as that required for coupling the fourth screw.

In the full bridge DC-DC converter 1 in accordance with this exemplary embodiment, the coupling sequence of the output inductor and the diode to be connected to the secondary side of the transformer may be changed to minimize the effect of contact resistors, which are formed when the transformer and the inductor are coupled to each other by the screw, on a saturation of the transformer, thus reducing a heat and a loss of the switch elements of the primary side and reducing a generation of noise. Furthermore, by reducing a drawback of a connection achieved by a screw coupling between the transformer and the inductor, it may be possible to replace a welding process, which is one step of a conventional method of manufacturing a full bridge DC-DC converter and is performed for coupling the secondary side of the transformer and the output inductor, with a screw coupling process.

While the present invention has been described with respect to the exemplary embodiments, it will be apparent to those skilled in the art that various changes and modifications may be made without departing from the spirit and scope of the invention as defined in the following claims.

What is claimed is:

1. A full bridge direct current-direct current (DC-DC) converter to which a current doubler is applicable, comprising:
   a transformer that reduces a substantially high alternating current (AC) voltage supplied to a primary side thereof and outputs the AC voltage to a secondary side thereof;
   a switching circuit that converts a transmitted substantially high DC voltage into a substantially high AC voltage and outputs the substantially high AC voltage to the primary side of the transformer; and
   an output circuit that receives and processes the output of the secondary side of the transformer and supplies the processed output to an electric load, the output circuit including,
      a first inductor having a first end connected to a first end of the load side;
      a first contact resistor formed by connecting a second end of the first inductor and a first end of the secondary side of the transformer;
      a second inductor having a first end connected to the first end of the load side;
      a second contact resistor formed by connecting a second end of the second inductor and a second end of the secondary side of the transformer;
      a first diode having an anode connected to a ground line which is the second end of the load side;
      a third contact resister formed by connecting a cathode of the first diode and electric contacts of the first inductor and the first contact resistor;
      a second diode having an anode connected to a ground line which is the second end of the load side; and
      a fourth contact resister formed by connecting a cathode of the second diode and electric contacts of the second inductor and the second contact resistor.

2. The full bridge DC-DC converter according to claim 1, wherein a first value of the voltage drop caused by a first current flowed through the first contact resister, the first inductor, the load side, the second diode, the fourth contact resistor and the second contact resistor is about the same as a second value of the voltage drop caused by a second current flowed through the second contact resister, the second inductor, the load side, the first diode, the third contact resistor and the first contact resistor, the value of the first current is about the same as that of the second current, and the resistance value of the third contact resistor is about the same as that of the fourth contact resistor.

3. The full bridge DC-DC converter according to claim 2, wherein the DC of the transformer is maintained at about zero (0) regardless of a deviation between values of the first contact resistor and the second contact resistor.

4. The full bridge DC-DC converter according to claim 1, wherein:
   the first contact resistor is formed by coupling a wire extended from the first inductor with a wire extended from the first end of the secondary side of the transformer by a first screw,
   the second contact resistor is formed by coupling a wire extended from the second inductor with a wire extended from the second end of the secondary side of the transformer by a second screw,
   the third contact resistor is formed by coupling a portion of the wire extended from the first end of the secondary side of the transformer, which is farther away from the first end of the secondary side of the transformer than a coupling point obtained by the first screw, with a wire extended from the anode of the first diode by a third screw, and
   the fourth contact resistor is formed by coupling a portion of the wire extended from the second end of the secondary side of the transformer, which is farther away from the second end of the secondary side of the transformer than a coupling point obtained by the second screw, with a wire extended from the anode of the second diode by a fourth screw.

5. The full bridge DC-DC converter according to claim 4, wherein the first screw and the second screw have about the same size and a torque required for coupling the first screw is about the same as that required for coupling the second screw, the third screw and the fourth screw have about the same size and a torque required for coupling the third screw is about the same as that required for coupling the fourth screw.

6. The full bridge DC-DC converter according to claim 1, wherein the switching circuit includes:
   a first switching element, a second switching element, a third switching element and a fourth switching element, and the switching circuit is driven in a full bridge manner in which the first and third switching elements are simultaneously driven and the second and fourth switching elements are simultaneously driven by a driving clock applied from an exterior, and when a phase and a cycle of the driving clock applied for switching the first and the fourth switching elements are fixed, an effective region of the output power transmitted to the primary side of the transformer from the switching circuit is adjusted by changing a phase of the driving clock applied for switching the second and fourth switching elements.

* * * * *